United States Patent [19]

McCourt

[11] Patent Number: 4,933,671
[45] Date of Patent: Jun. 12, 1990

[54] CURSOR

[75] Inventor: David J. McCourt, Hampstead, Md.

[73] Assignee: GTCO Corporation, Columbia, Md.

[21] Appl. No.: 179,945

[22] Filed: Apr. 11, 1988

[51] Int. Cl.[5] .............................................. G09G 3/02
[52] U.S. Cl. .................................... 340/710; 340/706; 178/18
[58] Field of Search ................. 340/706, 710; 178/18, 178/19

[56] References Cited

U.S. PATENT DOCUMENTS

| | | | |
|---|---|---|---|
| 2,836,805 | 12/1956 | Goldsmith | 336/136 |
| 3,210,701 | 5/1962 | Fastner et al. | 336/96 |
| 3,982,165 | 9/1976 | Rich | 178/18 |
| 4,213,005 | 7/1980 | Cameron | 178/18 |
| 4,240,065 | 12/1980 | Howbrook | 178/18 |
| 4,455,451 | 6/1984 | Kriz | 178/18 |
| 4,561,183 | 12/1985 | Shores | 340/710 |
| 4,564,835 | 1/1986 | Dhawan | 340/710 |
| 4,575,581 | 3/1986 | Langberg | 178/18 |
| 4,639,547 | 1/1987 | Jacob-Grinschgl et al. | 178/18 |
| 4,677,258 | 6/1987 | Kawashima et al. | 178/18 |
| 4,707,572 | 11/1987 | Kable et al. | 178/18 |
| 4,811,415 | 3/1989 | Barnes | 178/18 |
| 4,827,086 | 5/1989 | Rockwell | 340/710 |

Primary Examiner—David K. Moore
Assistant Examiner—M. Fatahiyar
Attorney, Agent, or Firm—John E. Benoit

[57] ABSTRACT

A cursor for use with an X-Y grid tablet comprises a single integral transparent plastic member having a substantially flat face with a circular groove machined or molded therein and crosshairs etched into the area enclosed by the groove. The member is mounted on a rotatable plate and magnet wire is wound inside the channel by using a needle having an eye large enough to allow the wire to pass therethrough. The base is rotated the exact number of times to establish the desired characteristic of the coil. A removable cap which fits over the area within the channel may be used to hold the wire while the base is turning. The ends of the wire pass through an aperture to the opposite side of the base. The completed coil is potted within the channel using an electrical grade epoxy.

8 Claims, 4 Drawing Sheets

CURSOR

The present invention relates generally to cursors used with graphic digitizers and, more specifically, to a cursor constructed substantially as an integral unit.

A cursor is a device used with a graphic digitizer table that sends a signal to a processor which evaluates the timing of a current wavefront in the X-Y coordinate grid tablet. The time it takes for current to go from one edge of the grid to the placement or location of the cursor (exact center of the coil of the cursor) on the grid in both "X" and "Y" directions determines the X-Y coordinate.

Cursors in use today consist of four main parts, which include the reticle, a base which holds the reticle and the rest of the cursor assembly, a printed circuit board, and a cable extending from the cursor.

In the current cursors, the reticle consists of a bobbin, usually plastic, with etched crosshairs. The bobbin is wound with an insulated annealed copper wire using a predetermined number of turns or windings.

The completed reticle is then assembled into a base. The reticle is either glued or press-fit into an opening in the base with the two wires of the wound coil then passing through the base and being soldered to the printed circuit board.

This reticle must be assembled in such a way that when a cursor is placed on a work surface, the plane of the base will be touching the surface; but the plane of the reticle is normally recessed so that it will be spaced above the work surface a distance such as 0.003 of an inch. The purpose for this recession of the reticle is that it keeps it from being scratched and worn.

There are several drawbacks and disadvantages relative to this type of cursor construction. First, it is difficult to maintain the 0.003-inch clearance since the reticle, when pressfit, sometimes falls out or can easily be pushed out, which, in turn, destroys the coil. Second, when adhesives are used, they can almost always be seen through the desirable clear base, which is disconcerting and objectionable to the user.

Accordingly, it is an object of the present invention to provide a cursor wherein the base of the cursor is formed as an integral unit and the wire is wound within the base.

It is a further object of this invention to provide a method for making an integral cursor with a wound wire coil.

Another object of this invention is to provide apparatus for making an integral cursor with a wound wire coil.

These and other objects of the invention will be readily understood from the following description taken together with the drawings.

SUMMARY OF THE INVENTION

The present invention provides a cursor for use with an X-Y grid tablet which comprises a single integral substantially rigid member, such as transparent plastic, having a substantially flat face with a circular channel machined or molded therein and having crosshairs etched into the area enclosed by said channel. The member is mounted in a rotatable plate and insulated wire is wound inside the channel by using a needle-like structure having an eye large enough to allow the wire to pass therethrough. The base is rotated the exact number of turns to establish the desired characteristics of the coil. A removable cap may be used which fits over the area within the channel so as to hold the wire while the base is turning. The ends of the wire pass through a channel and an aperture in the base to the opposite side thereof. The completed coil and channel is potted with an electrical grade encapsulant such as epoxy.

DETAILED DESCRIPTION OF THE INVENTION

FIGS. 1-4 are illustrations of the prior art showing a cursor as it is constructed at the present time.

Cursor 11 includes circular borehole 13 therethrough and channel 15 extending from borehole 13 and terminating in small borehole 17, which also extends through the cursor. Cursor 11 also includes boreholes 19 which are provided for securing it to a cover which holds the previously referred to printed circuit board and cable, neither of which is shown.

Figure 1:
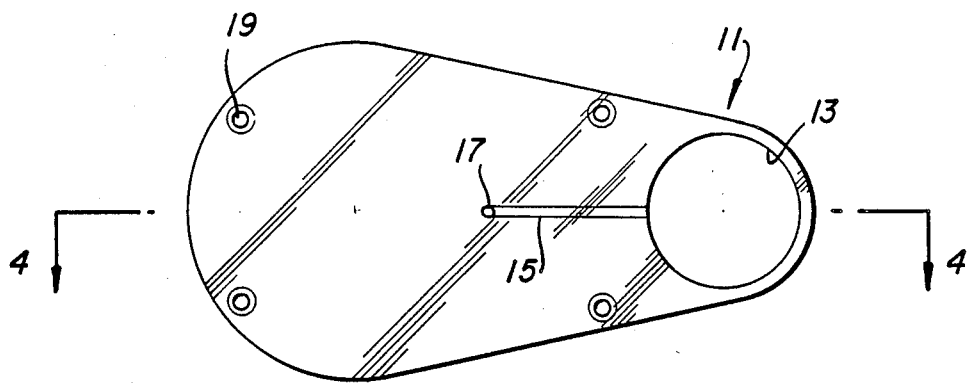
FIG. 1 is a top plan view of a cursor base of the prior art.
Figure 3:
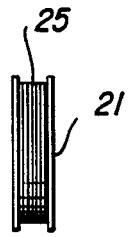
FIG. 3 is a side view of the reticle of FIG. 2.
Figure 2:
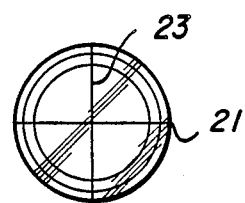
FIG. 2 is a plan view of a reticle used with the cursor of FIG. 1.

FIGS. 2 and 3 illustrate reticle 21, which is either pressfit into borehole 13 or glued within the borehole under presentday usage. Reticle 21 includes crosshairs 23, with reticle 21 being formed like a bobbin having insulated wire 25 wound thereon.

Figure 4:
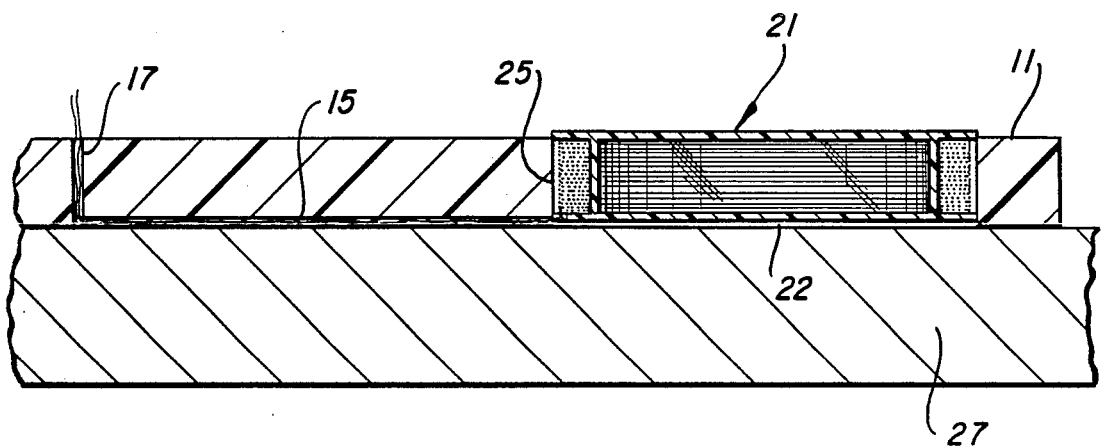
FIG. 4 is a partial sectional view of the prior art cursor resting on a grid tablet.

FIG. 4 illustrates reticle 21 in place within cursor base 11. The ends of annealed copper wire 25 extends through channel 15 and through borehole 17, with the ends being connected to a printed circuit board (not shown). Face 22 of the reticle is in a plane recessed from the bottom plane of the cursor so as to extend above the surface of X-Y grid tablet 27. As explained above, this prevents scratching or marring of surface 22.

Figure 5:
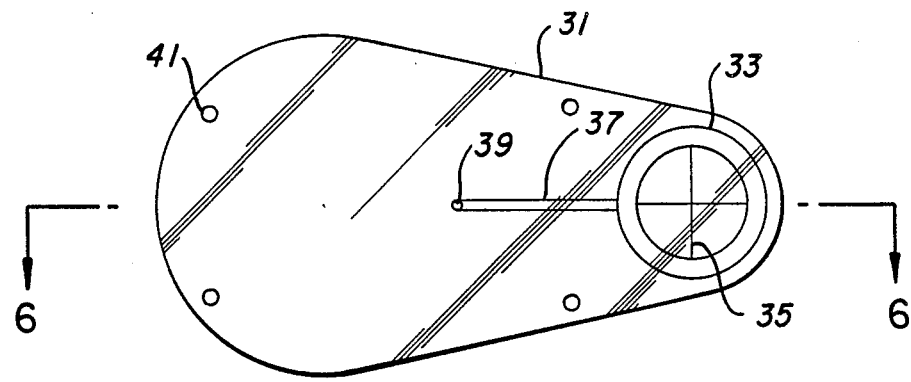
FIG. 5 is a top plan view of the cursor base of the present invention.

Turning now to FIG. 5, there is shown a cursor of the present invention which includes cursor base 31 having circular groove 33 therein. The cursor is of a substantially rigid integral material such as a transparent plastic. Groove 33 may be molded with the cursor base or may be machined after the base is completed. Crosshairs 35 are etched, machined, or molded into the surface defined by circular groove 33. Base 31 includes channel 37 and borehole 39, as well as boreholes 41, all of which are for the same purpose as described relative to the prior art.

Figure 6:
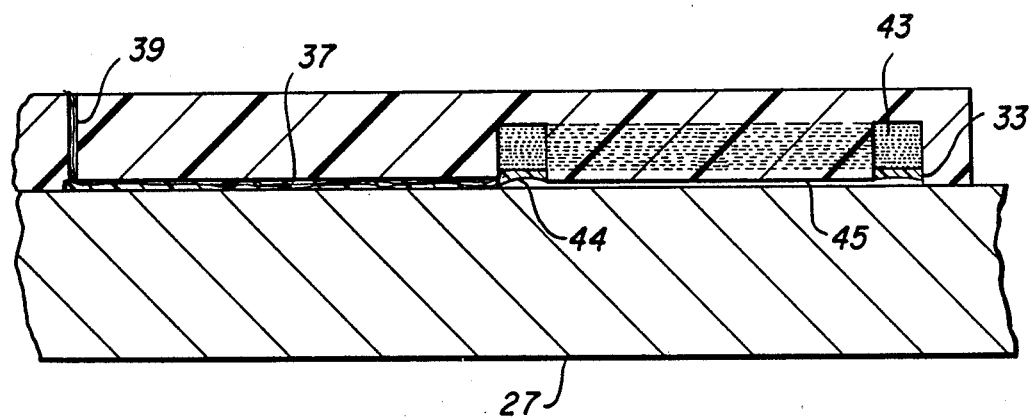
FIG. 6 is a partial sectional view taken through lines 6—6 of FIG. 5.

FIG. 6, which is a partial cross-section through line 6—6 of FIG. 5, illustrates the cursor of FIG. 5 resting on grid tablet 27. As can be seen, insulated wire 43, such as magnet wire, is wrapped around central portion 45 and end wires extend through channel 37 and borehole 39. The wire is shown as being potted with an electrical grade encapsulant such as potting epoxy 44 which keeps coil 43 and the lead wires in place and protects them from the environment.

Figure 8:
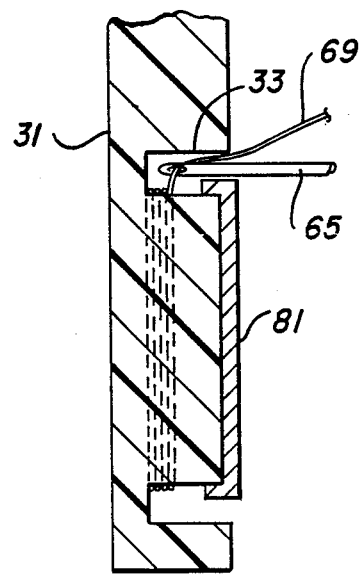
FIG. 8 is a partial sectional view of the winding equipment of FIG. 7.
Figure 7:
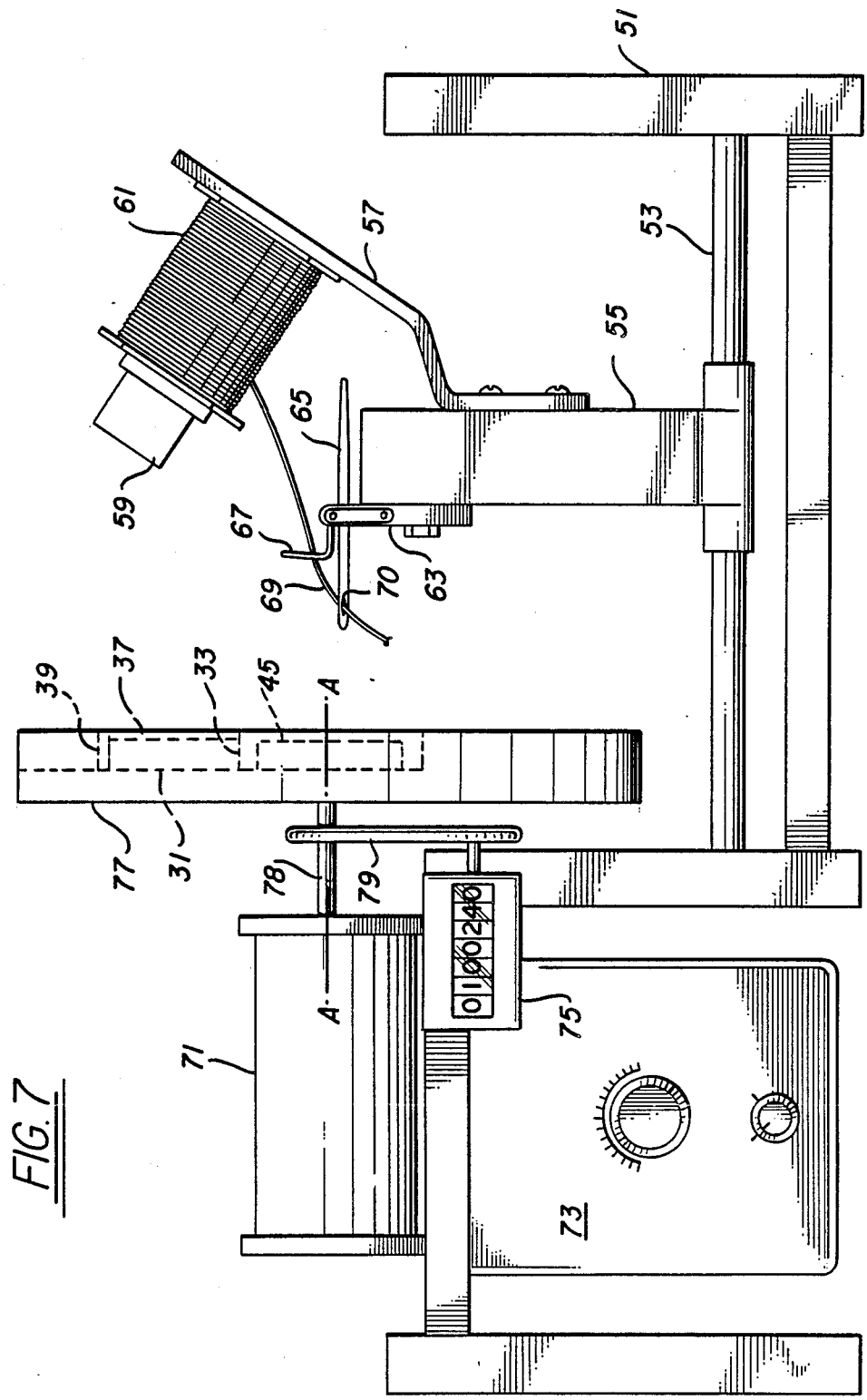
FIG. 7 is a schematic view of apparatus used for winding the coil on the cursor base of FIG. 5.

Turning now to FIG. 7 and FIG. 8, apparatus is shown which is used to provide the winding in the cursor of FIG. 5. Frame 51 has mounted therein rod 53. Support 55 is slidably mounted on rod 53 and has mounted thereto plate 57 with spindle 59 secured thereto and extending outwardly therefrom. Wire spool 61, containing insulated wire, is rotatable on spindle 59. Also mounted on support 55 is holder 63 (on which is mounted needle 65) and plate 67, having a guidehole therethrough. Wire 69 passes through the guidehole in plate 67 and through eyelet 70 of needle 65. Electric motor 71 is mounted above the other side of frame 51 and motor control 73 is also mounted to the frame. Counter 75 is mounted to the frame so as to provide an indication of the number of turns of the insulated wire being wound in the cursor. Cursor holder 77 is mounted to drive shaft 78 of electric motor 71. Holder 77 is so constructed as to have a recessed area which mates with cursor 31 when it is placed therein. When cursor 31 is placed within the channel of holder 77, the axis of drive shaft 78 extends in a line A—A, which passes directly through the center of crosshairs 35 of the cursor.

When the cursor is ready to be wound, support 55 is moved along rod 53 until it reaches a position wherein the needle is within circular groove 33, as shown in FIG. 8. A length of wire 69 is provided so as to extend away from circular groove 33 a sufficient distance so as to permit passage of wire through channel 37 and borehole 39, as shown in FIG. 6. This wire may be collected and taped to central portion 25, where it remains during the winding procedure.

It is preferable to use a removable cap 81 during the winding process in order to ensure that the wire is retained in place within the channel. When the needle is in place as shown in FIG. 8, the motor is started and finger 79, attached to drive shaft 78, trips the counter at each revolution so as to indicate the exact number of turns of the wire for a desired condition. When the winding is completed, cable 69 is severed, also leaving a length sufficient to pass through channel 37 and borehole 39 and cap 81 is removed.

Cursor 33 is then removed from cursor holder 77 and the end wires are then passed through channel 37 and borehole 39 for ultimate connection to a printed circuit board with attached cable (not shown). The wire is then covered with the epoxy.

Figure 9:
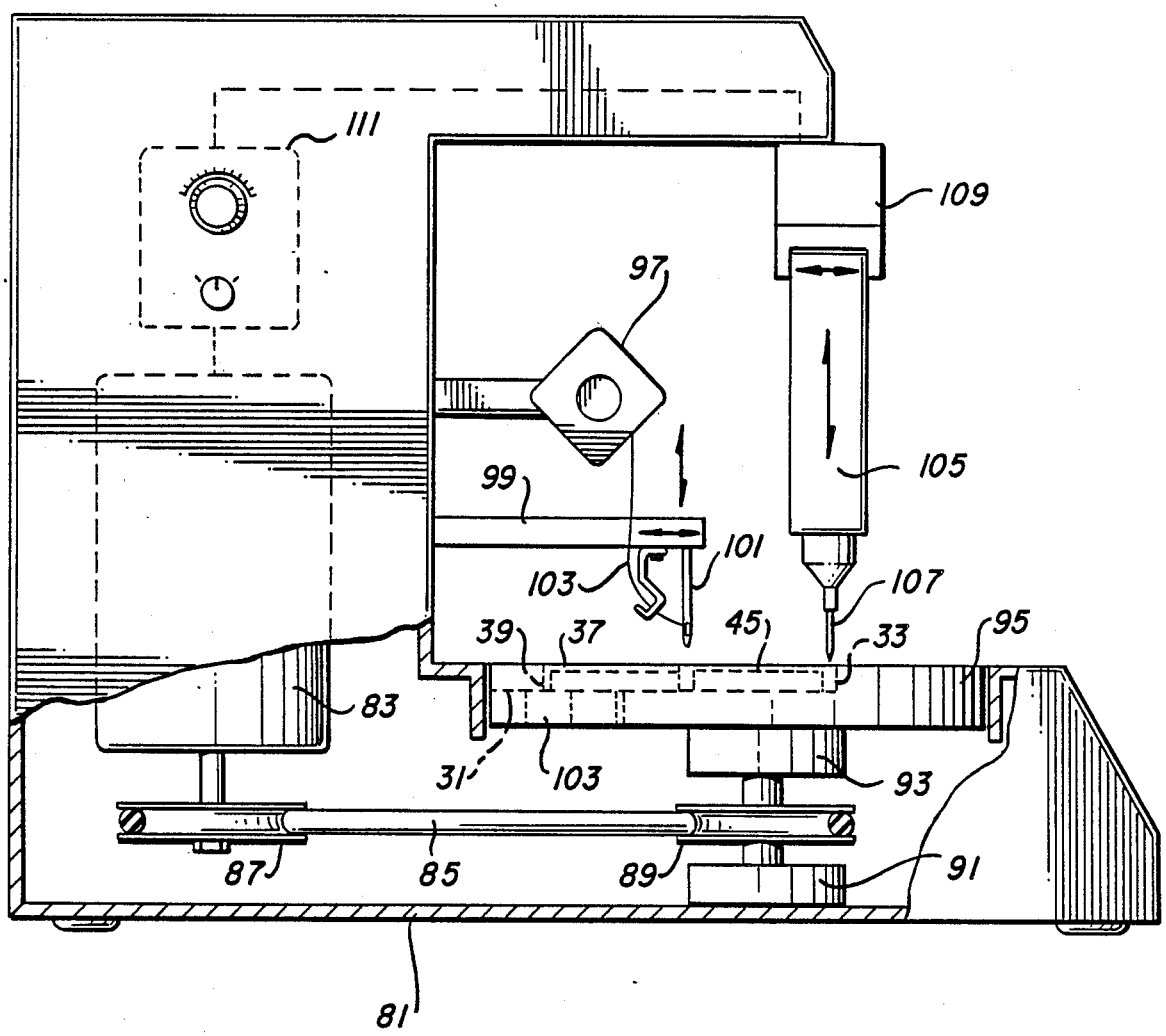
FIG. 9 is a schematic view of a modification of the apparatus of FIG. 7.

FIG. 9 is a schematic diagram of a more fully automated system for winding and potting a cursor.

Housing 81 encloses electric motor 83 which rotates driven pulley 89 through drive pulley 87 and belt 85. The shaft of pulley 89 is mounted between bearings 91 and 93 and is secured to turntable 95. Turntable 95 is similar to holder 77 of FIG. 7 and is configured so as to retain cursor 31 with the crosshairs lying on the axis of the shaft of pulley 89.

Wire spool 97 is mounted to housing 81 as is support 99 from which needle 101 depends. As previously discussed, wire 103 is guided through the eye of needle 101.

The winding procedure is the same as shown in FIGS. 7 and 8 and a cap may be used. With the cursor lying in a horizontal plane the encapsulant may be applied through applicator 105, including needle 107. As indicated by the arrows both support 99 and applicator 105 are adjustable both vertically and horizontally relative to turntable 95.

Once the winding procedure is finished, the cap is removed and the wires are fed along channel 37 and through borehole 39. In order to permit passage of the wires outwardly from the cursor, turntable 95 has an opening 103.

After the wires are in place turntable 95 and applicator 105 are adjusted relative to each other so that the epoxy may be deposited in groove 33 and channel 37. If desired control 111 may be provided so as to program the winding and encapsulating steps.

The completed cursor of the present invention as described above has numerous advantages over the cursor of the prior art. Since the cursor base assembly becomes one piece, the reticle cannot be pushed out, and will not fall out, of the base. Since the reticle clearance above the grid tablet is machined or molded into the base, there is no need for precise assembly techniques in attempting to adjust to the proper distance. The assembly becomes much simpler and can be accomplished by one operator rather than the two which are normally required in present-day assemblies. Additionally, the appearance of the cursor becomes more appealing and the reticle crosshair does not need to be lined up since the crosshair is perfectly perpendicular to the base housing.

The above description and accompanying drawings are illustrative, only, since equivalent structures could be used without departing from the invention, the scope of which is to be limited only by the following claims.

I claim:

1. A cursor device for use with an X-Y grid tablet comprising
    a substantially rigid one-piece base member having at least one substantially continuous flat face;
    a circular groove enclosing an area in said flat face;
    crosshairs in the area enclosed by said groove;
    a channel in said base member adjacent said face extending from said circular groove and terminating at a borehole extending through said base member;
    a predetermined number of turns of insulated wire within said circular groove, the ends of said wire passing through said channel and adapted for connection to selected circuitry; and
    electrical grade encapsulants covering said wire within said groove and said channel.

2. The cursor device of claim 1 wherein said base member is transparent.

3. The cursor device of claim 1 wherein the face area enclosed by said circular groove lies in a plane parallel to and spaced inwardly from the plane of the remainder of said flat face.

4. The cursor device of claim 1 further comprising a second substantially continous flat face substantially parallel to said one flat face.

5. A method of making a cursor device for use with an X-Y grid tablet comprising
    forming a substantially rigid one-piece base member having at least one substantially continuous flat face;
    providing a circular groove and adjacent channel in said face, said channel terminating in a borehole through said base member;
    winding an insulated wire a preselected number of turns within said groove;
    leading the ends of said wire through said channel and said borehole; and covering said wire in said groove and channel with an encapsulant.

6. The method of claim 5 wherein said base member, groove, channel, and borehole are molded as a one-piece unit.

7. The method of claim 5 wherein said base member is molded as a one-piece unit and said groove, channel, and borehole are machined in said base member.

8. The method of claim 5 further comprising
placing a cap over the area enclosed by said groove before winding said wire in said groove; and
removing said cap before covering said wire with said encapsulant.

* * * * *